(12) United States Patent
Tanaka et al.

(10) Patent No.: US 7,600,369 B2
(45) Date of Patent: Oct. 13, 2009

(54) GAS TURBINE LOAD CONTROL DEVICE

(75) Inventors: Satoshi Tanaka, Takasago (JP);
Toshimitsu Morimoto, Takasago (JP);
Toshiyuki Hashi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 450 days.

(21) Appl. No.: 11/643,961

(22) Filed: Dec. 22, 2006

(65) Prior Publication Data
US 2007/0169463 A1 Jul. 26, 2007

(30) Foreign Application Priority Data
Dec. 27, 2005 (JP) ............................. 2005-373847

(51) Int. Cl.
*F02C 9/26* (2006.01)
(52) U.S. Cl. .................. 60/39.281; 290/40 B
(58) Field of Classification Search ................ 60/39.27, 60/39.281, 773; 290/40 B, 40 C
See application file for complete search history.

(56) References Cited
U.S. PATENT DOCUMENTS
4,201,923 A * 5/1980 Reed et al. ................. 290/40 R
5,761,895 A * 6/1998 Chu et al. ..................... 60/773

FOREIGN PATENT DOCUMENTS
JP 10-196315 A 7/1998

* cited by examiner

*Primary Examiner*—Louis J Casaregola
(74) *Attorney, Agent, or Firm*—Western, Hattori, Daniels & Adrian, LLP

(57) ABSTRACT

A gas turbine load control device includes load setting means, first bias setting means, second bias setting means, target output setting means, and so forth. The target output setting means sets up a target output by adding a positive side bias value to a load set value when the load setting means gradually increases the load set value in response to an increase in a requested load set value inputted from requested load setting means. The target output setting means sets up the target output by subtracting a negative side bias value from the load set value when the load setting means gradually decreases the load set value in response to a decrease in the requested load set value.

3 Claims, 9 Drawing Sheets

GAS TURBINE LOAD CONTROL DEVICE

BACKGROUND OF THE INVENTION

1. Field of the Invention

The present invention relates to a gas turbine load control device configured to control an amount of fuel supply to a gas turbine so as to control a gas turbine output (a power generator output) so as to achieve a target output.

2. Description of the Related Art

During a parallel-in operation of a power generator in a gas turbine power generation plant, that is, when a power generator is connected to an electric power system (an electric power network) to transmit electric power generated by the power generator to the electric power system, an amount of fuel supply to a gas turbine needs to be controlled by use of a gas turbine load control device installed in the gas turbine power generation plant so that a power generator output (active electric power) follows a variation in a requested load set value for the electric power system. The requested load set value is normally sent from a central load dispatching center to the gas turbine load control device in the form of a requested load setting command.

FIG. 11 is a block diagram showing a configuration of a conventional gas turbine load control device, and FIG. 12 is an explanatory chart showing variations of LDSET (a target output) and a power generator output (an actual output) in response to an increase in the requested load set value in a case where the gas turbine load control device is employed.

As shown in FIG. 11, the gas turbine power generation plant has a configuration in which a rotating shaft 2 of a gas turbine 1 is connected to a rotating shaft 4 of a power generator 3. Although detailed explanation will be omitted herein, the gas turbine 1 includes a gas turbine body, a compressor, and a combustor. When the gas turbine 1 starts, the power generator 3 generates electric power as the power generator 3 is driven and rotated by the gas turbine 1. The generated electric power is transmitted from the power generator 3 to an electric power system via a breaker, a transformer and other devices which are not illustrated herein. The value of the generated electric power (the active electric power) in this case is measured by a MW converter 5 serving as an active electric power meter. Then, the value (the actual output) measured by this MW converter 5 is fed back to a gas turbine load control device 10.

A fuel control valve 6 is connected to the combustor of the gas turbine 1. Gas turbine fuel, such as gas or liquid sent from an unillustrated fuel supply system such as a fuel tank, is subjected to flow rate control by the fuel control valve 6, and is then supplied to the combustor. Here, the control of opening and closing this fuel control valve 6 (the control of an amount of fuel supply) is performed by the gas turbine load control device 10. The gas turbine load control device 10 includes deviation operators (subtracters) 11 and 15, high/low monitors (comparators) 12 and 13, an analog memory 14, and a PI controller 16.

The deviation operator 11 calculates a deviation between the requested load set value (command) sent from an unillustrated central load dispatching center (a host computer) and LDSET (a load set value) equivalent to an output of the analog memory 14 (load setting deviation=requested load set value−LDSET).

The high/low monitor 12 determines whether or not the load setting deviation is equal to, or above 0.1 MW (load setting deviation≧0.1 MW). In a case where the load setting deviation is determined to be equal to, or above 0.1 MW, the high/low monitor 12 outputs a LDSET increase command to the analog memory 14. Specifically, the LDSET increase command is ON when the load setting deviation is equal to, or above 0.1 MW. The LDSET increase command is OFF when the load setting deviation is lower than 0.1 MW.

The high/low monitor 13 determines whether or not the load setting deviation is equal to, or below −0.1 MW (load setting deviation≦−0.1 MW). In a case where the load setting deviation is determined to be equal to, or below −0.1 MW, the high/low monitor 13 outputs a LDSET decrease command to the analog memory 14. Specifically, the LDSET decrease command is ON when the load setting deviation is equal to, or below −0.1 MW. The LDSET decrease command is OFF when the load setting deviation is higher than −0.1 MW.

The analog memory 14 starts increasing the LDSET when the high/low monitor 12 inputs thereto the LDSET increase command (when the LDSET increase command is ON). The analog memory 14 gradually increases the LDSET at a predetermined pace of increase (such as 10 MW/min.) during a period when the LDSET increase command is continuously inputted (during the period when the LDSET increase command is ON). The analog memory 14 stops increasing the LDSET when the high/low monitor 12 stops inputting the LDSET increase command (when the LDSET increase command is OFF). The analog memory 14 starts decreasing the LDSET when the high/low monitor 13 inputs thereto the LDSET decrease command (when the LDSET decrease command is ON). The analog memory 14 gradually decreases the LDSET at a predetermined pace of decrease (such as −10 MW/min.) during a period when the LDSET decrease command is continuously inputted (during the period when the LDSET decrease command is ON). The analog memory 14 stops decreasing the LDSET when the high/low monitor 13 stops inputting the LDSET decrease command (when the LDSET increase command is OFF). Then, this LDSET is outputted from the analog memory 14 to the deviation operator (the subtracter) 15 as a target output.

The deviation operator 15 calculates deviation between the target output (the LDSET) set up by the analog memory 14 and the power generator output (the active electric power) measured by the MW converter 5 (output deviation=target output−power generator output).

The PI controller 16 controls an aperture of the fuel control valve 6 by performing a proportional-integral operation based on the output deviation calculated by the deviation operator 15. Specifically, when the target output is greater than the power generator output, the PI controller 16 increases the aperture of the fuel control valve 6, and thereby increases the amount of fuel supply to the gas turbine 1 (the combustor). Accordingly, the output of the gas turbine 1 is increased, and thus the output of the power generator 3 is increased (the power generator output is caused to be equal to the target output). On the other hand, when the target output is smaller than the power generator output, the PI controller 16 reduces the aperture of the fuel control valve 6, and thereby decreases the amount of fuel supply to the gas turbine 1 (the combustor). Accordingly, the output of the gas turbine 1 is decreased, and the output of the power generator 3 is decreased (the power generator output is caused to be equal to the target output). In the PI controller 16, K denotes a proportional gain; s: a Laplace operator; T: a time constant for proportional-integral control (an integral time constant); and 1/T: an integral gain.

For example, it is supposed that the requested load set value, the target output (the LDSET), and the power generator output (the actual output) are identical to one another until time T1, and that the requested load set value is increased stepwise (raised from 100 MW to 200 MW in the illustrated example) by a command from the central load dispatching center at the time T1. In this case, as shown in FIG. 12, the LDSET increase command is outputted from the high/low monitor 12 to the analog memory 14 (the LDSET increase command is ON). This is because the deviation between the requested load set value and the LDSET calculated by the deviation operator 11 is equal to, or above 0.1 MW. As a result, the analog memory 14 gradually increases the LDSET at the predetermined pace of increase from the time T1 until the LDSET reaches the requested load set value (200 MW) at time T2 (until the LDSET increase command is OFF as the load setting deviation falls below 0.1 MW). That is, the target output is gradually increased at the predetermined pace of increase.

The output deviation at this time between the target output and the power generator output (the active electric power) is calculated by the deviation operator 15, and the PI controller 16 performs the proportional-integral operation based on this output deviation. Hence, the fuel control valve 6 is activated (the valve aperture of the fuel control valve 6 is increased) on the basis of a result of this proportional-integral operation. As a consequence, the amount of fuel supply to the gas turbine 1 is increased, and the gas turbine output is increased. Accordingly, the power generator output (the active electric power) is increased. It is made possible to finally cause the power generator output (the active electric power) to be equal to the target output (the requested load set value).

The reason for gradually increasing or decreasing the LDSET (the target output) by use of the analog memory 14 is to change the LDSET (the target output) at a rate of change allowable for the gas turbine 1 even when the requested load set value is rapidly changed. When the LDSET (the target output) is rapidly changed in response to the rapid change of the requested load set value, a rapid change in the output of the gas turbine 1 may incur damage of the gas turbine 1, for example.

The documents concerning the prior art related to this application include JPA No. 10 (1998)-196315. This document discloses a method of, and a device for controlling a load on a multiple axis combined cycle plant.

In recent years, there is a growing demand from a power transmission side (the electric power system side) to the gas turbine power generation plant side that the power generator output in response to the variation in the requested load set value be caused to follow the variation faster. For example, in a country where a power generation company and a power transmission company are different from each other, there is a demand from the power transmission company to the power generation company that the power generator output in response to the variation in the requested load set value be caused to follow the variation faster.

In this regard, the conventional gas turbine load control device 10 can accelerate the follow-up of the power generator output in response to the variation in the requested load set value by setting the shorter time constant T for the proportional-integral control (i.e. by increasing the integral gain 1/T). Nevertheless, when the time constant T for the proportional-integral control is shortened, the increase and decrease of the amount of fuel supply to the gas turbine 1 is more frequently repeated as the gas turbine load control device 10 attempts to stabilize the power generator output (the active electric power) against the variation in the power generation output (the active electric power) associated with a variation in a power factor of the electric power system. Such a phenomenon is not favorable to the gas turbine 1.

For this reason, it is necessary to set the relatively long time constant T for the proportional-integral control in order to stabilize the amount of fuel supply to the gas turbine 1.

However, when the long time constant T is set up for the proportional-integral control, the follow-up of the power generator output slows down at the time when the requested load set value varies. Accordingly, it is not possible to satisfy the demand from the electric power system side (the power transmission company side) that the load following capability be improved.

SUMMARY OF THE INVENTION

The present invention has been made in view of the foregoing circumstances. It is an object of the present invention to provide a gas turbine load control device capable of accelerating the follow-up of a power generator output (active electric power) in response to a variation in a requested load set value even when a time constant for proportional-integral control is set relatively long.

A gas turbine load control device according to a first aspect of the present invention includes load setting means, first bias setting means, second bias setting means, target output setting means, output deviation operation means, and proportional-integral controlling means. The load setting means gradually increases a load set value at a predetermined pace of increase until the load set value reaches a requested load value when the requested load set value is increased. The load setting means gradually decreases the load set value at a predetermined pace of decrease until the load set value reaches the requested load set value when the requested load set value is decreased. The first bias setting means sets a bias value of a positive side (a positive side bias value) as a bias value for the load set value. The second bias setting means sets a bias value of the negative side (a negative side bias value) as the bias value for the load set value. The target output setting means sets a target output for a power generator by adding the positive side bias value to the load set value when the load setting means gradually increases the load set value in response to the increase in the requested load set value. The target output setting means sets the target output by subtracting the negative side bias value from the load set value when the load setting means gradually decreases the load set value in response to the decrease in the requested load set value. The output deviation operating means calculates output deviation between the target output and an output of a power generator to be measured by power generator output measuring means. The proportional-integral controlling means controls flow rate controlling means for fuel of a gas turbine configured to rotate the power generator, by performing a proportional-integral operation based on the output deviation.

A second aspect of the present invention provides the gas turbine load control device according to the first aspect, and is characterized in the following points. The first bias setting means defines the positive side bias value as a function of the load set value, and the second bias setting means defines the negative side bias value as a function of the load set value.

A third aspect of the present invention provides the gas turbine load control device according to any of the first and second aspects, and is characterized in the following points. The first bias setting means gradually increases the positive side bias value at a predetermined pace of increase from zero until the positive side bias value reaches a predetermined value when the load setting means starts increasing the load set value. The first bias setting means gradually decreases the positive side bias value at a predetermined pace of decrease from the predetermined value until the positive side bias value reaches zero when the load setting means terminates the increase in the load set value. The second bias setting means gradually increases the negative side bias value at a predetermined pace of increase from zero until the negative side bias value reaches a predetermined value when the load setting means starts decreasing the load set value. The second bias setting means gradually decreases the negative side bias value at a predetermined pace of decrease from the predetermined value until the negative side bias value reaches zero when the load setting means terminates the decrease in the load set value.

According to the gas turbine load control device of the first aspect, instead of defining the load set value directly as the target output for the power generator, the target output setting means sets up the target output for the power generator by adding the positive side bias value to the load set value when the load setting means gradually increases the load set value in response to the increase in the requested load set value. The target output setting means sets up the target output for the power generator by subtracting the negative side bias value from the load set value when the load setting means gradually decreases the load set value in response to the decrease in the requested load set value. Thus, for example, even when the relatively long time constant for the proportional-integral control is set up so that the gas turbine can be stably operated in response to a variation in the power factor of the electric power system, it is made possible to accelerate the follow-up of the power generator output in response to the increase or decrease in the requested load set value.

According to the gas turbine load control device of the second aspect, the first bias setting means defines the positive side bias value as a function of the load set value, and the second bias setting means defines the negative side bias value as a function of the load set value. Accordingly, it is made possible to define the positive side bias value and the negative side bias value by using more appropriate values which correspond to a gas turbine load band (the power generator output).

According to the gas turbine load control device of the third aspect, the first bias setting means gradually increases the positive side bias value at the predetermined pace of increase from zero until the positive side bias value reaches the predetermined value when the load setting means starts increasing the load set value. The first bias setting means gradually decreases the positive side bias value at the predetermined pace of decrease from the predetermined value until the positive side bias value reaches zero when the load setting means terminates the increase in the load set value. Meanwhile, the second bias setting means gradually increases the negative side bias value at the predetermined pace of increase from zero until the negative side bias value reaches the predetermined value when the load setting means starts decreasing the load set value. The second bias setting means gradually decreases the negative side bias value at the predetermined pace of decrease from the predetermined value until the negative side bias value reaches zero when the load setting means terminates the decrease in the load set value. Accordingly, it is made possible to control the load more stably as compared to a case of changing the positive side bias value and the negative side bias value stepwise.

DETAILED DESCRIPTION OF THE PREFERRED EMBODIMENT

Now, an embodiment of the present invention will be described below in detail with reference to the accompanying drawings.

Figure 1:
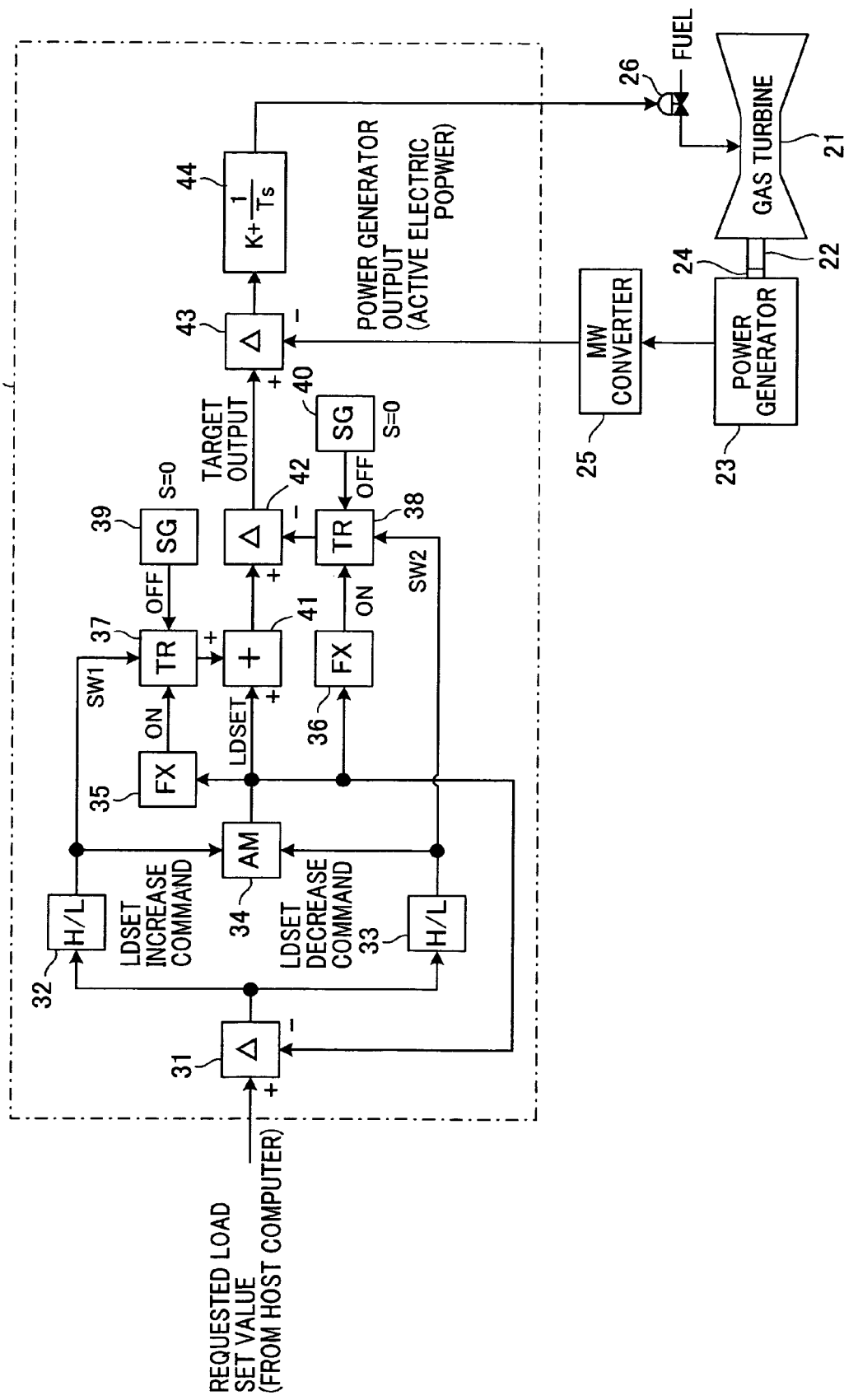
FIG. 1 is a block diagram showing a configuration of a gas turbine load control device according to an embodiment of the present invention.
Figure 2:
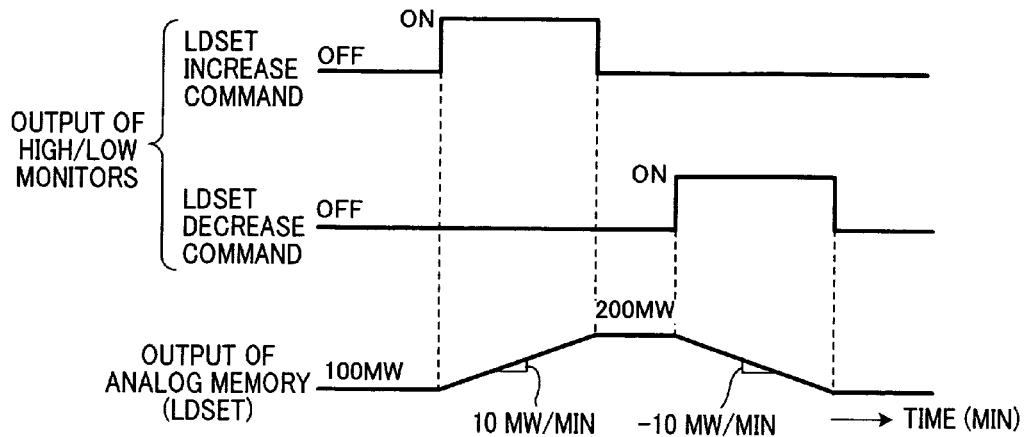
FIG. 2 is an explanatory chart of a feature of an analog memory included in the gas turbine load control device.
Figure 3:
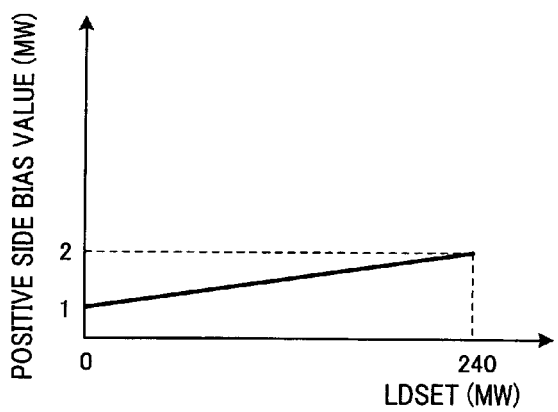
FIG. 3 is an explanatory chart of a feature of a function generator included in the gas turbine load control device.
Figure 4:
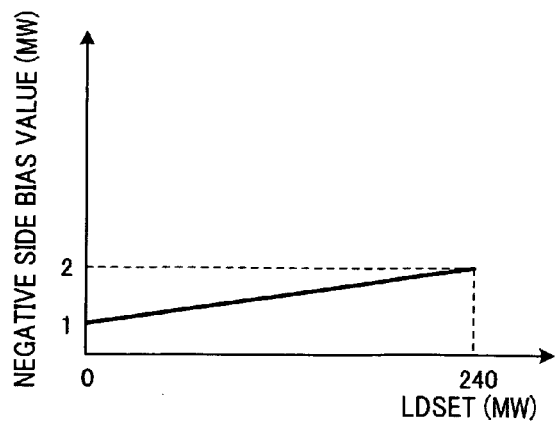
FIG. 4 is an explanatory chart of a feature of another function generator included in the gas turbine load control device.
Figure 5:
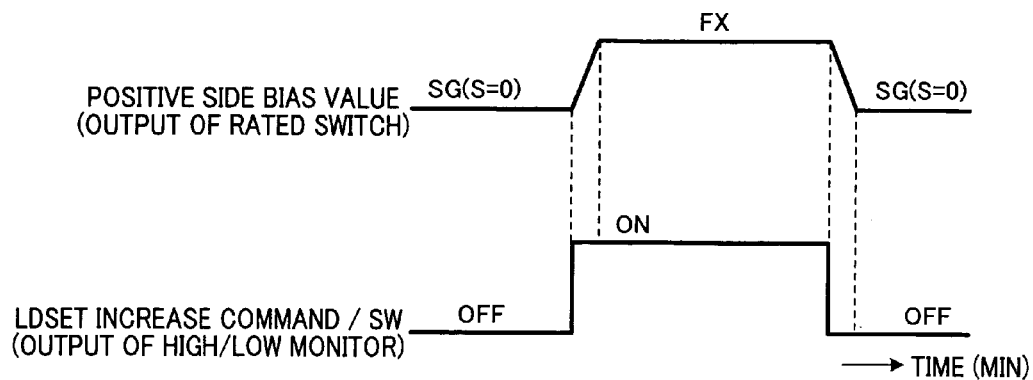
FIG. 5 is an explanatory chart of a feature of a rated switch included in the gas turbine load control device.
Figure 6:
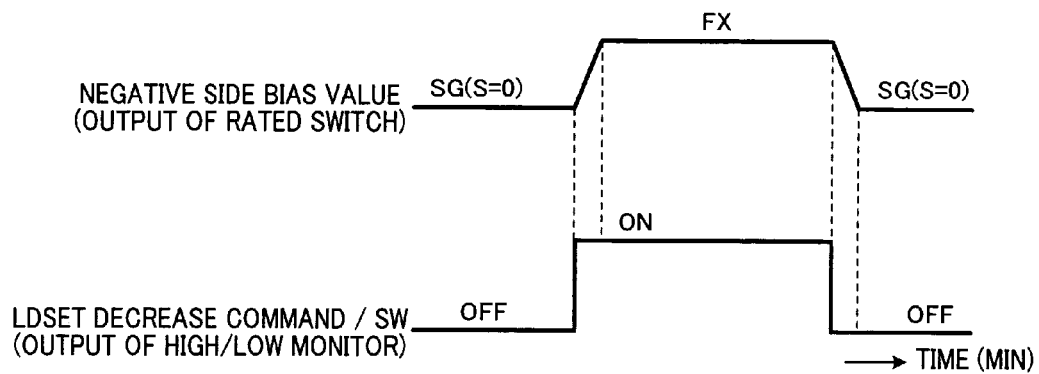
FIG. 6 is an explanatory chart of a feature of another rated switch included in the gas turbine load control device.

FIG. 1 is a block diagram showing a configuration of a gas turbine load control device according to an embodiment of the present invention. FIG. 2 is an explanatory chart of a feature of an analog memory included in the gas turbine load control device. FIG. 3 and FIG. 4 are explanatory charts of features of function generators included in the gas turbine load control device. FIG. 5 and FIG. 6 are explanatory charts of features of rated switches included in the gas turbine load control device.

Figure 7:
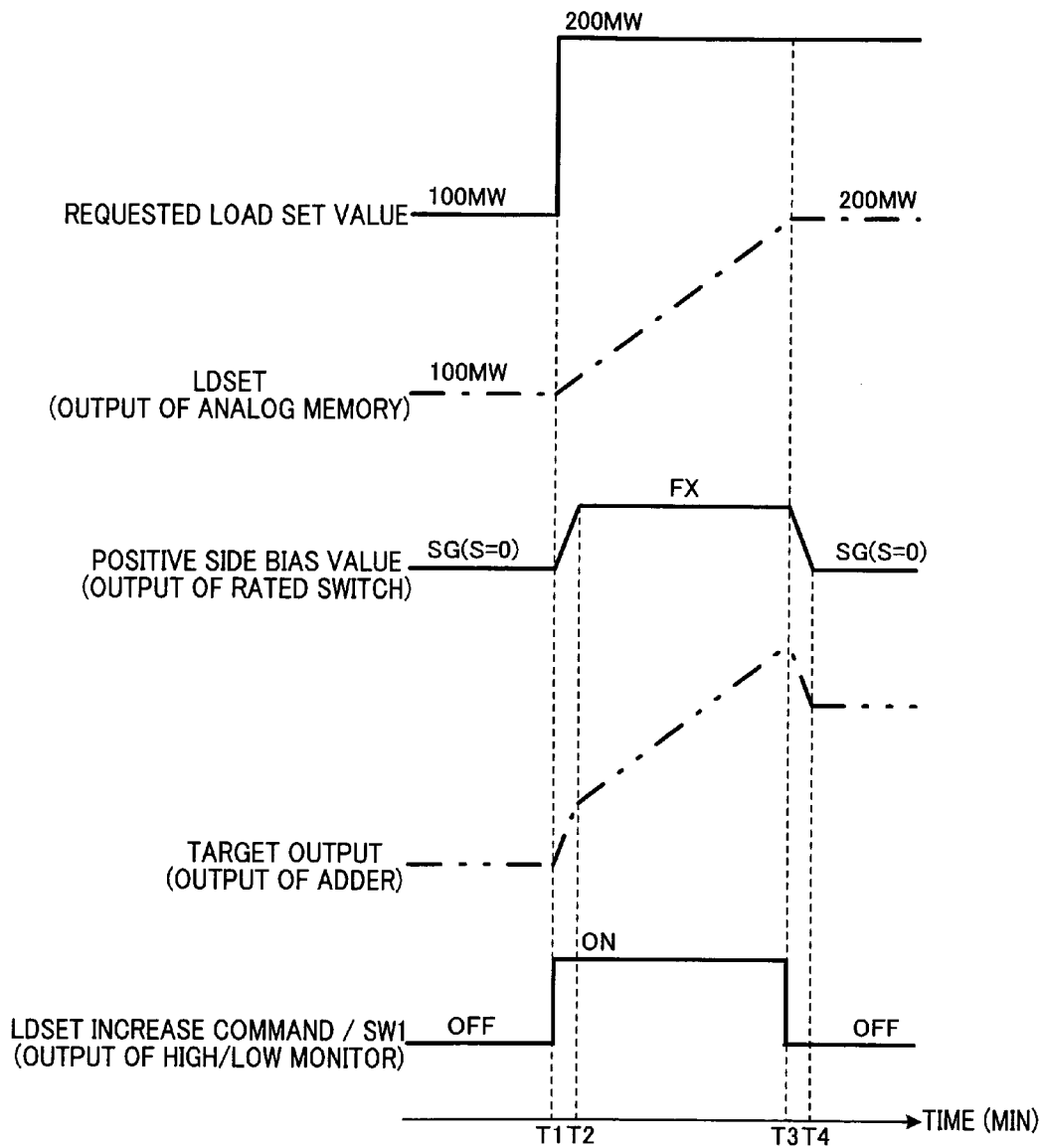
FIG. 7 is an explanatory chart individually showing variations of a LDSET, a target output, a power generator output (an actual output) and so forth in response to an increase in a requested load set value in a case where the gas turbine load control device is employed.
Figure 8:
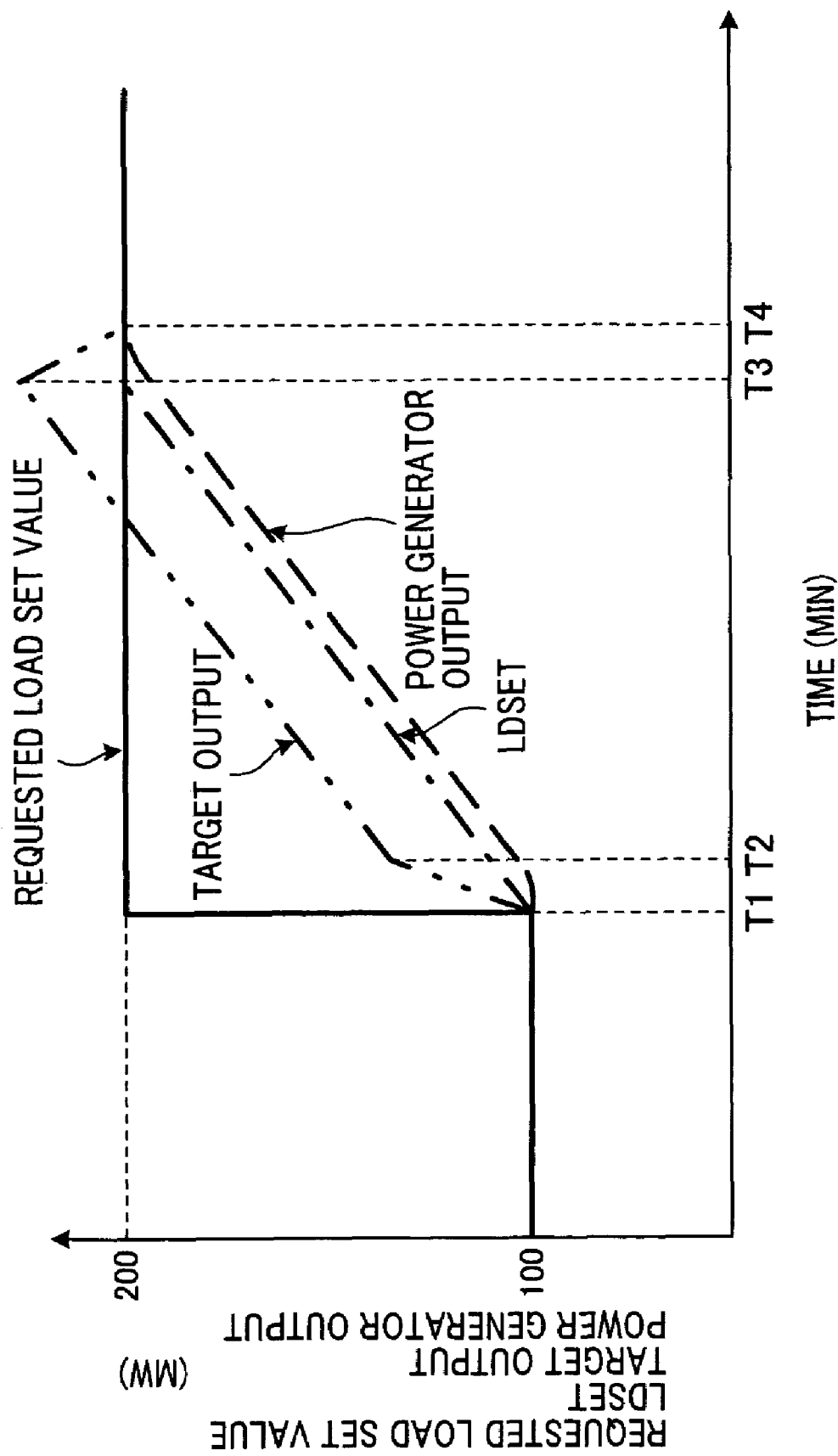
FIG. 8 is an explanatory chart collectively showing the variations of the LDSET, the target output, and the power generator output (the actual output) in response to the increase in the requested load set value in a case where the gas turbine load control device is employed.
Figure 9:
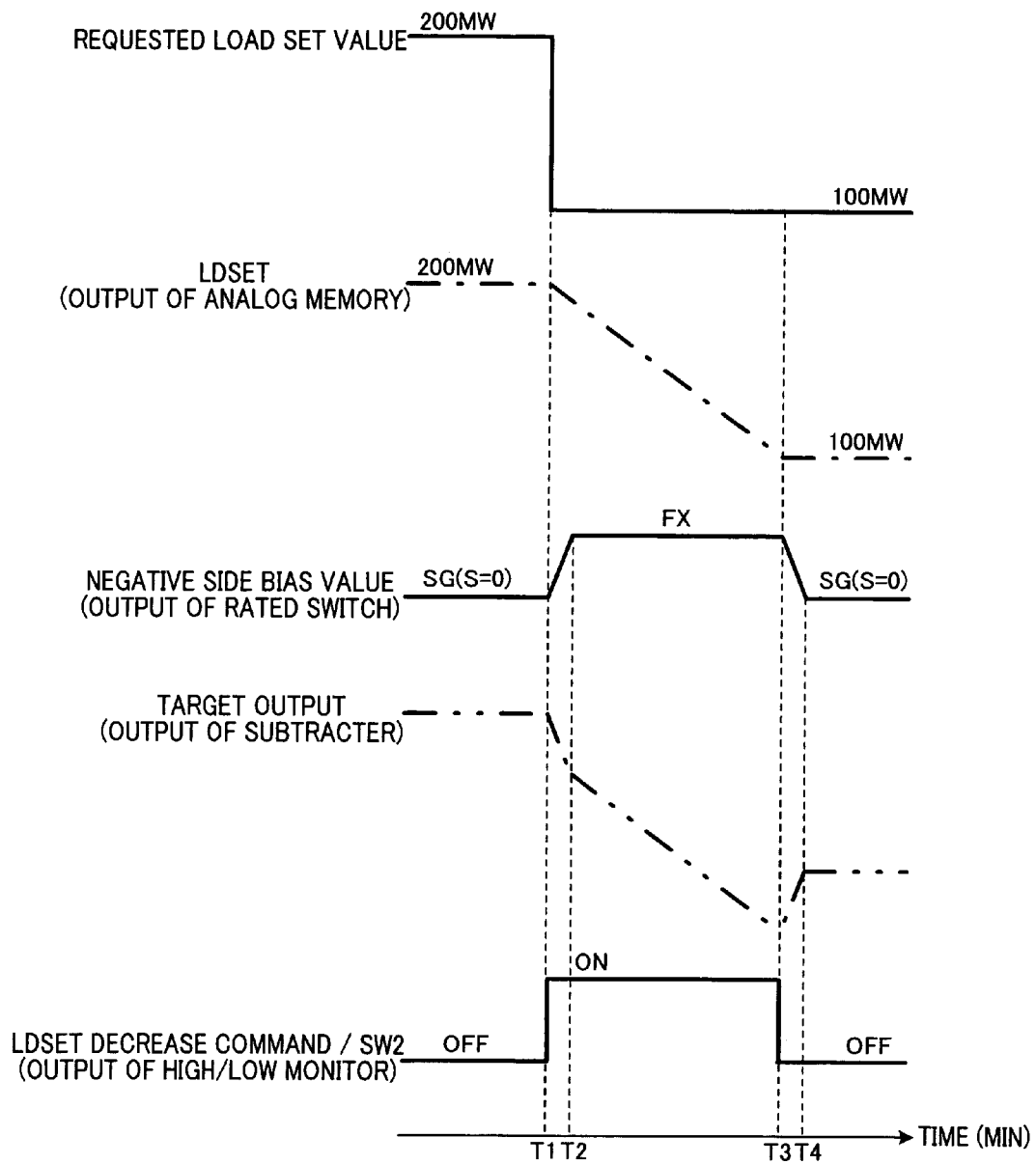
FIG. 9 is an explanatory chart individually showing variations of the LDSET, the target output, the power generator output (the actual output) and so forth in response to a decrease in the requested load set value in a case where the gas turbine load control device is employed.
Figure 10:
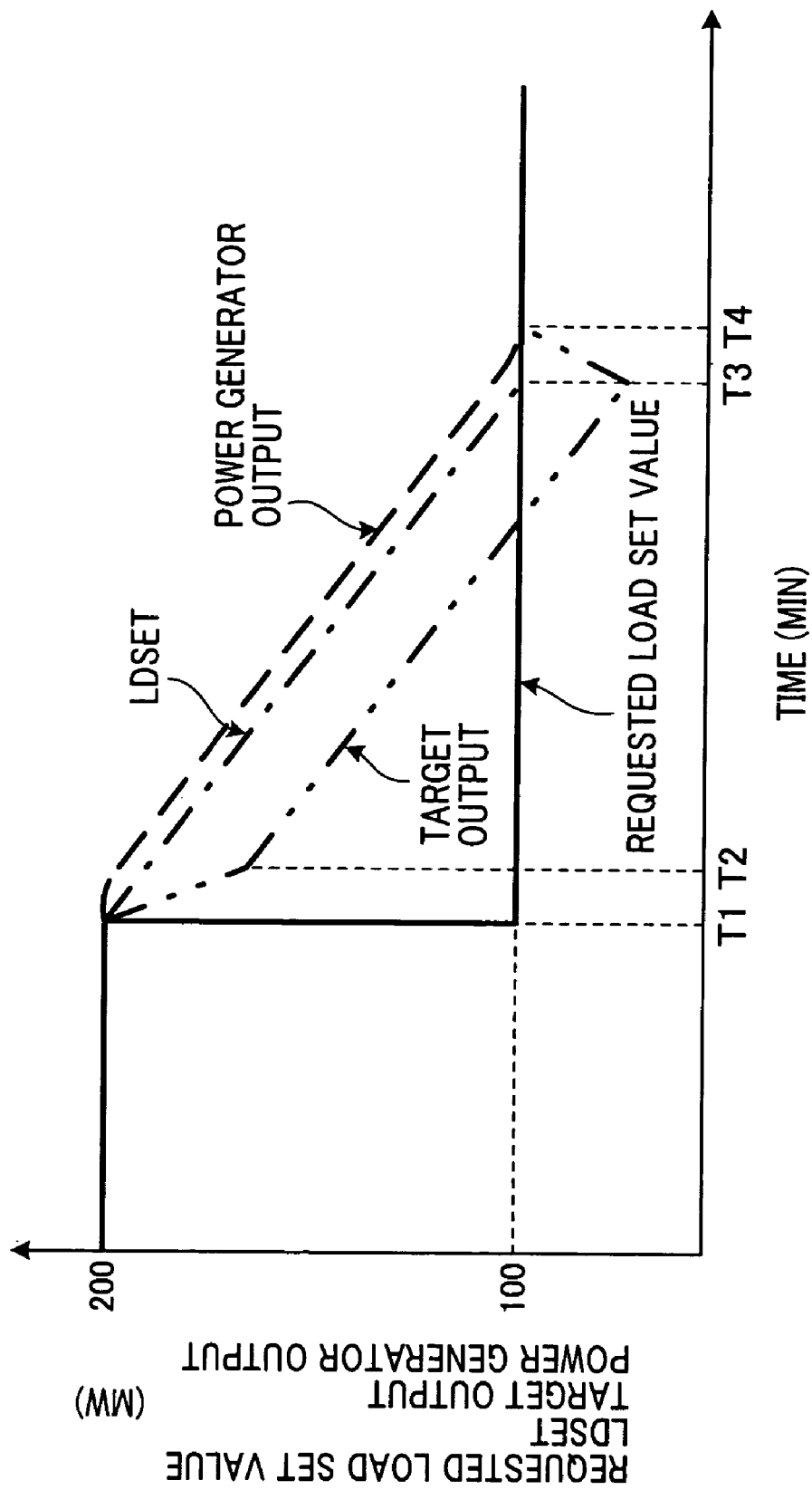
FIG. 10 is an explanatory chart collectively showing the variations of the LDSET, the target output, and the power generator output (the actual output) in response to the decrease in the requested load set value in a case where the gas turbine load control device is employed.
Figure 11:
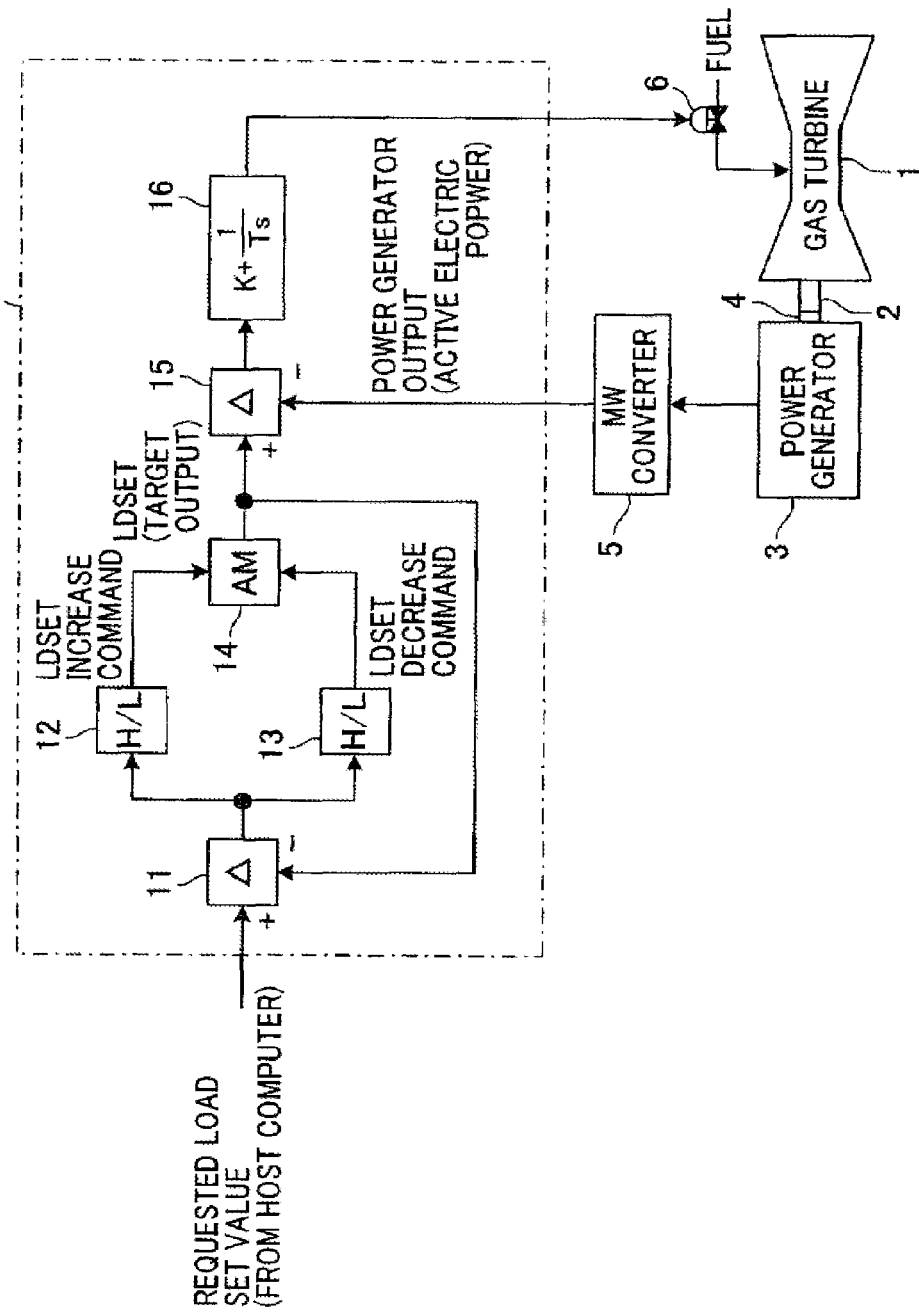
FIG. 11 is a block diagram showing a configuration of a conventional gas turbine load control device.

FIG. 7 is an explanatory chart individually showing variations of a LDSET, a target output, a power generator output (an actual output) and so forth in response to an increase in a requested load set value in a case where the gas turbine load control device is employed. FIG. 8 is an explanatory chart collectively showing the variations of the LDSET, the target output, and the power generator output (the actual output) in response to the increase in the requested load set value in a case where the gas turbine load control device is employed. FIG. 9 is an explanatory chart individually showing variations of the LDSET, the target output, the power generator output (the actual output) and so forth in response to a decrease in the requested load set value in a case where the gas turbine load control device is employed. FIG. 10 is an explanatory chart collectively showing the variations of the LDSET, the target output, and the power generator output (the actual output) in response to the decrease in the requested load set value in a case where the gas turbine load control device is employed.

As shown in FIG. 1, a gas turbine power generation plant has a configuration in which a rotating shaft 22 of a gas turbine 21 is connected to a rotating shaft 24 of a power generator 23. Although detailed explanation will be omitted herein, the gas turbine 21 includes a gas turbine body, a compressor, and a combustor. When the gas turbine 21 starts, the power generator 23 generates electric power as the power generator 23 is driven and rotated by the gas turbine 21. The generated electric power is transmitted from the power generator 23 to an electric power system via a breaker, a transformer and other devices which are not illustrated herein. A value of the generated electric power (active electric power) in this case is measured by a MW converter 25 serving as an active electric power meter. Then, the value (the actual output) measured by this MW converter 25 is fed back to a gas turbine load control device 30.

A fuel control valve 26, which serves as flow rate controlling means controlling a flow rate of gas turbine fuel, is connected to the combustor of the gas turbine 21. The gas turbine fuel, such as gas or liquid sent from an unillustrated fuel supply system such as a fuel tank, is subjected to flow rate control by the fuel control valve 26, and is then supplied to the combustor. The control of opening and closing this fuel control valve 26 (the control of an amount of fuel supply) is performed by the gas turbine load control device 30.

The gas turbine load control device 30 includes deviation operators (subtracters) 31 and 43, high/low monitors (comparators) 32 and 33, an analog memory 34, function generators 35 and 36, rated switches 37 and 38, signal generators 39 and 40, an adder 41, a subtracter 42, and a PI controller 44. The deviation operator 31, the high/low monitors 32 and 33, and the analog memory 34 collectively function as load setting means. The function generator 35, the signal generator 39, and the rated switch 37 collectively function as first bias setting means. The function generator 36, the signal generator 40, and the rated switch 38 collectively function as second bias setting means. The adder 41 and the subtracter 42 collectively function as target output setting means. The deviation operator 43 functions as output deviation operating means. The PI controller 44 functions as proportional-integral controlling means. These functions of the gas turbine load control device 30 are constructed by software, and are executed by a computer. However, the present invention is not limited to this configuration. It is also possible to construct these functions by hardware.

The deviation operator 31 calculates a deviation between a requested load set value (command) sent from an unillustrated central load dispatching center (a host computer) which serves as requested load setting means, and LDSET (a load set value) equivalent to an output of the analog memory 34 (load setting deviation=requested load set value-LDSET). Incidentally, the requested load setting means is not limited to the central load dispatching center (the host computer). The requested load setting means may be in other forms such as a load setter installed in the gas turbine power generation plant.

The high/low monitor 32 determines whether or not the LDSET is increased to reach the requested load set value when the requested load set value increases. Specifically, the high/low monitor 32 determines whether or not the load setting deviation is equal to, or above 0.1 MW (load setting deviation≧0.1 MW). When the load setting deviation is determined to be equal to, or above 0.1 MW, the high/low monitor 32 outputs a LDSET increase command to the analog memory 14, and outputs a positive side bias switch command SW1 (ON) to the rated switch 37. That is, the LDSET increase command is ON when the load setting deviation is equal to, or above 0.1 MW, and is OFF when the load setting deviation is lower than 0.1 MW. Incidentally, the determination value is defined as 0.1 MW. However, the determination value is not limited to this value. It is also possible to set up a smaller value or a larger value than 0.1 MW as appropriate.

The high/low monitor 33 determines whether or not the LDSET is decreased to reach the requested load set value when the requested load set value decreases. Specifically, the high/low monitor 33 determines whether or not the load setting deviation is equal to, or below −0.1 MW (load setting deviation≦−0.1 MW). In a case where the load setting deviation is determined to be equal to, or below −0.1 MW, the high/low monitor 33 outputs a LDSET decrease command to the analog memory 14, and outputs a negative side bias switch command SW2 (ON) to the rated switch 38. That is, the LDSET decrease command is ON when the load setting deviation is equal to, or below −0.1 MW, and is OFF when the load setting deviation is higher than −0.1 MW. Incidentally, the determination value is defined as −0.1 MW. However, the determination value is not limited to this value. It is also possible to set up a smaller value or a larger value than −0.1 MW as appropriate.

As shown in FIG. 2, the analog memory 34 starts increasing the LDSET when the high/low monitor 32 inputs thereto the LDSET increase command (when the LDSET increase command is ON). The analog memory 34 gradually increases the LDSET at a predetermined pace of increase (such as 10 MW/min.) during a period when the LDSET increase command is continuously inputted (during the period when the LDSET increase command is ON). The analog memory 34 stops increasing the LDSET when the high/low monitor 32 stops inputting the LDSET increase command (when the LDSET increase command is OFF). As shown in FIG. 2, the analog memory 34 starts decreasing the LDSET when the high/low monitor 33 inputs thereto the LDSET decrease command (when the LDSET decrease command is ON). The analog memory 34 gradually decreases the LDSET at a predetermined pace of decrease (such as −10 MW/min.) during a period when the LDSET decrease command is continuously inputted (during the period when the LDSET decrease command is kept ON). The analog memory 34 stops decreasing the LDSET when the high/low monitor 33 stops inputting the LDSET decrease command (when the LDSET decrease command is OFF).

As in the case of the related art, the reason for gradually increasing or decreasing the LDSET by use of the analog memory 34 as described above is to change the LDSET at a rate of change allowable for the gas turbine 21 even when the requested load set value is rapidly changed. When the LDSET is rapidly changed in response to the rapid change of the requested load set value, a rapid change in the output of the gas turbine 21 may incur damage of the gas turbine 21, for example. Note that the pace of increase and the pace of decrease of the LDSET in the analog memory 34 may be the same as each other, or different from each other. These values may be respectively set at optimum values depending on the gas turbine power generation plant as appropriate.

The LDSET set up by the analog memory 34 is not used directly as the target output for the power generator 23. Instead, the LDSET to which a bias is added is defined as the target output for the power generator 23. Accordingly, the LDSET is outputted to each of the adder 41, the function generator 35, and the function generator 36.

As shown in FIG. 3, the function generator 35 sets a predetermined value which is increased in response to the increase in the LDSET outputted from the analog memory 34, as a positive side bias value. In the example shown in FIG. 3, the function generator 35 increases the value from 1 MW to 2 MW in response to the increase in the LDSET from 0 MW to a maximum load set value (which is equal to 240 MW in the illustrated example). That is, the positive side bias value is not a constant value, but is a function of the LDSET. The reason for defining the positive side bias value as the function of the LDSET is that the appropriate positive side bias value varies depending on a gas turbine load zone (a power generator output). Here, the signal generator 39 is set at zero (S=0).

As shown in FIG. 4, the function generator 36 sets a predetermined value which is decreased in response to the decrease in the LDSET outputted from the analog memory 34, as a negative side bias value. In the example shown in FIG. 4, the function generator 36 decreases the value from 2 MW to 1 MW in response to the decrease in the LDSET from the maximum load set value (which is equal to 240 MW in the illustrated example) to 0 MW. That is, the negative side bias value is not a constant value, but is a function of the LDSET. The reason for defining the negative side bias value as the function of the LDSET is that the appropriate negative side bias value varies depending on the gas turbine load zone (the power generator output). Here, the signal generator 40 is set at zero (S=0).

Note that the positive side bias value and the negative side bias value are by no means limited to a range of 1 to 2 MW. By calculation or a test run, the bias values may be appropriately set at optimum values for the respective gas turbine power generation plants, in consideration of the degree of improving the follow-up of the power generator output in response to the change in the requested load set value (how fast the power generator output is to follow up) or of the stability of load control, for example. The positive side bias value and the negative side bias value are values equal to each other in the examples shown in FIG. 3 and FIG. 4. These values are linearly increased and decreased in response to the increase and decrease in the LDSET. However, the present invention is not limited to this configuration. These bias values may be mutually different values, and the behavior of the increase and decrease in the values corresponding to the increase and decrease in the LDSET does not have to be linear.

The rated switch 37 performs switching between selection of an output from the function generator 35 and selection of an output from the signal generator 39 as an output to the adder 41. Specifically, the rated switch 37 switches to the function generator 35 side when the positive side bias switch command SW1 to be inputted from the high/low monitor 32 is ON, thereby sending the output from the function generator 35 to the adder 41. On the contrary, the rated switch 37 switches to the signal generator 39 side when the positive side bias switch command SW1 is OFF, thereby sending the output from the signal generator 39 to the adder 41.

Since the rated switch 37 is rated, the rated switch 37 gradually increases the positive side bias value from zero until the positive side bias value reaches a predetermined value at a predetermined pace of increase when the analog memory 34 starts increasing the LDSET. The rated switch 37 gradually decreases the positive side bias value from the predetermined value until the positive side bias value reaches zero at a predetermined pace of decrease when the analog memory 34 stops increasing the LDSET.

Specifically, as shown in FIG. 5, the requested load set value is increased, and thus the LDSET increase command is outputted (ON) from the high/low monitor 32. Accordingly, when the analog memory 34 starts increasing the LDSET, the positive side bias switch command SW1 outputted from the high/low monitor 32 is ON concurrently with the LDSET increase command. For this reason, the rated switch 37 switches the output to the adder 41 from the output of the signal generator 39 (SG (S=0) in FIG. 5) to the output of the function generator 35 (FX in FIG. 5). At this time, the positive side bias value is not increased stepwise, but is increased gradually from zero (the output value of the signal generator 39) until the positive side bias value reaches the predetermined value (the output value of the function generator 35) instead. Meanwhile, the LDSET reaches the requested load set value, and thus the LDSET increase command from the high/low monitor 32 is OFF. Accordingly, when the analog memory 34 stops increasing the LDSET, the positive side bias switch command SW1 outputted from the high/low monitor 32 is OFF concurrently with the LDSET increase command. For this reason, the rated switch 37 switches the output to the adder 41 from the output of the function generator 35 (FX in FIG. 5) to the output of the signal generator 39 (SG (S=0) in FIG. 5). At this time, the positive side bias value is not decreased stepwise, but is gradually decreased from the predetermined value (the output value of the function generator 35) until the positive side bias value reaches zero (the output value of the signal generator 39). Incidentally, by calculation or a test run, the specific rates (the pace of increase and the pace of decrease) of the rated switch 37 may be appropriately set at optimum values for the respective gas turbine power generation plant, in consideration of the stability of load control, for example.

The rated switch 38 performs switching between selection of an output from the function generator 36 and selection of an output from the signal generator 40, as an output to the subtracter 42. Specifically, the rated switch 38 switches to the function generator 36 when the negative side bias switch command SW2 to be inputted from the high/low monitor 33 is ON. Thereby, the output from the function generator 36 is outputted to the subtracter 42. On the other hand, the rated switch 38 switches to the signal generator 40 when the negative side bias switch command SW2 is OFF. Thereby, the output from the signal generator 40 is outputted to the subtracter 42.

Since the rated switch 38 is rated, the rated switch 38 gradually increases the negative side bias value from zero until the negative side bias value reaches a predetermined value at a predetermined pace of increase when the analog memory 34 starts decreasing the LDSET. The rated switch 38 gradually decreases the negative side bias value from the predetermined value until the negative side bias value reaches zero at a predetermined pace of decrease when the analog memory 34 stops decreasing the LDSET.

Specifically, as shown in FIG. 6, the requested load set value is decreased, and thus the LDSET decrease command is outputted (ON) from the high/low monitor 33. Accordingly, when the analog memory 34 starts decreasing the LDSET, the negative side bias switch command SW2 outputted from the high/low monitor 33 is ON concurrently with the LDSET decrease command. For this reason, the rated switch 38 switches the output to the subtracter 42 from the output of the signal generator 40 (SG (S=0) in FIG. 6) to the output of the function generator 36 (FX in FIG. 6). At this time, the negative side bias value is not increased stepwise, but is gradually increased from zero (the output value of the signal generator 40) until the negative side bias value reaches the predetermined value (the output value of the function generator 36). Meanwhile, the LDSET reaches the requested load set value, and thus the LDSET decrease command from the high/low monitor 33 is OFF. Accordingly, when the analog memory 34 stops decreasing the LDSET, the negative side bias switch command SW2 outputted from the high/low monitor 33 is OFF concurrently with the LDSET decrease command. For this reason, the rated switch 38 switches the output to the subtracter 42 from the output of the function generator 36 (FX in FIG. 6) to the output of the signal generator 40 (SG (S=0) in FIG. 6). At this time, the negative side bias value is not decreased stepwise, but is gradually decreased from the predetermined value (the output value of the function generator 36) until the negative side bias value reaches zero (the output value of the signal generator 40). Incidentally, by calculation or a test run, the specific rates (the pace of increase and the pace of decrease) of the rated switch 38 may be appropriately set at optimum values for the respective gas turbine power generation plants, in consideration of the stability of load control, for example.

The adder 41 sets up the target output for the power generator 23 by adding the positive side bias value outputted from the rated switch 37 to the LDSET outputted from the analog memory 34. The subtracter 43 sets up the target output for the power generator 23 by subtracting the negative side bias value outputted from the rated switch 38 from the output value from the adder 41, that is, the LDSET outputted from the analog memory 34. Note that the positive side bias switch command SW1 from the high/low monitor 32 and the negative side bias switch command SW2 from the high/low monitor 33 are not concurrently turned ON. Hence, switching to the function generator 35 by the rated switch 37 and switching to the function generator 36 by the rated switch 38 do not concurrently take place. Accordingly, the addition of the output from the function generator 35 (the positive side bias value) to the LDSET by the adder 41 and subtraction of the output from the function generator 36 (the negative side bias value) from the LDSET by the subtracter 42 do not concurrently take place.

The deviation operator 43 calculates deviation between the target output (the LDSET to which the bias is added) for the power generator 23 set up by any one of the adder 41 and the subtracter 42 and the power generator output (the active electric power) measured by the MW converter 25 (output deviation=target output−power generator output).

The PI controller 44 controls the aperture of the fuel control valve 26 by performing proportional-integral operation based on the output deviation calculated by the deviation operator 43. Specifically, when the target output is greater than the power generator output (an actual output), the PI controller 44 increases an aperture, and thus increases the amount of fuel supply to the gas turbine 21 (the combustor). Thereby, the output of the gas turbine is increased, and thus the power generator output (the actual output) is increased (the power generator output is caused to be equal to the target output). On the other hand, when the target output is smaller than the power generator output (the actual output), the PI controller 44 reduces the aperture of the fuel control valve 26, and thus decreases the amount of fuel supply to the gas turbine 21 (the combustor). Thereby, the output of the gas turbine is decreased, and thus the power generator output (the actual output) is decreased (the power generator output is caused to be equal to the target output). In the PI controller 44, K denotes a proportional gain; s: a Laplace operator; T: a time constant for proportional-integral control (an integral time constant); and 1/T: an integral gain.

A concrete example of the above is described below. For instance, It is supposed that the requested load set value, the LDSET, the target output, and the power generator output (the actual output) are identical to one another until time T1, and that the requested load set value is increased stepwise (is raised from 100 MW to 200 MW in the illustrated example) by a command from the central load dispatching center at the time T1. In this case, as shown in FIGS. 7 and 8, the LDSET increase command is outputted from the high/low monitor 32 to the analog memory 34 (the LDSET increase command is ON) as the deviation between the requested load set value and the LDSET calculated by the deviation operator 31 is equal to, or above 0.1 MW. As a result, the analog memory 34 gradually increases the LDSET at the predetermined pace of increase from the time T1 until the LDSET reaches the requested load set value (200 MW) at time T3 (until the LDSET increase command is OFF as the load setting deviation falls below 0.1 MW).

In this case, since the positive side bias switch command SW1 to be outputted from the high/low monitor 32 is ON at the time T1, the rated switch 37 switches the output to the adder 41 from the output of the signal generator 39 to the output of the function generator 35. As a result, the positive side bias value to be outputted from the rated switch 37 is gradually increased at the predetermined pace of increase from zero (the output value of the signal generator 39) to the predetermined value (the output value of the function generator 35) (is increased until the time T2). Thereafter, when the positive side bias switch SW1 is OFF at the time T3, the rated switch 37 switches the output to the adder 41 from the output of the function generator 35 to the output of the signal generator 39. As a result, the positive side bias value to be outputted from the rated switch 37 is gradually decreased at the predetermined pace of decrease from the predetermined value (the output value of the function generator 35) to zero (the output value of the signal generator 39) (is decreased until the time T4).

The target output for the power generator 23 is set up by adding the positive side bias value at this time to the LDSET by use of the adder 41. Subsequently, the output deviation between this target output and the power generator output (the active electric power) is calculated by the deviation operator 43. Then, the PI controller 44 performs the proportional-integral operation based on the output deviation, and the fuel control valve 26 is activated on the basis of a result of the proportional-integral operation (the valve aperture of the fuel control valve 26 is increased). As a consequence, the amount of fuel supply to the gas turbine 21 is increased, and the gas turbine output is thus increased. Accordingly, the power generator output (the active electric power) is increased. It is made possible to finally cause the power generator output (the active electric power) to be equal to the target output (the requested load set value).

It is supposed that the requested load set value, the LDSET, the target output, and the power generator output (the actual output) are identical to one another until the time T1, and that the requested load set value is decreased stepwise (reduced from 200 MW to 100 MW in the illustrated example) by a command from the central load dispatching center at the time T1. In this case, as shown in FIGS. 9 and 10, the LDSET decrease command is outputted from the high/low monitor 33 to the analog memory 34 (the LDSET decrease command is ON) as the deviation between the requested load set value and the LDSET calculated by the deviation operator 31 is equal to, or below −0.1 MW. As a result, the analog memory 34 gradually decreases the LDSET at the predetermined pace of decrease from the time T1 until the LDSET reaches the requested load set value (200 MW) at the time T3 (until the LDSET increase command is OFF as the load setting deviation exceeds −0.1 MW).

In this case, since the negative side bias switch command SW2 to be outputted from the high/low monitor 33 is ON at the time T1, the rated switch 38 switches the output to the subtracter 42 from the output of the signal generator 40 to the output of the function generator 36. As a result, the negative side bias value to be outputted from the rated switch 38 is gradually increased at the predetermined pace of increase from zero (the output value of the signal generator 40) to the predetermined value (the output value of the function generator 36) (is increased until the time T2). Thereafter, when the negative side bias switch SW2 is OFF at the time T3, the rated switch 38 switches the output to the subtracter 42 from the output of the function generator 36 to the output of the signal generator 40. As a result, the negative side bias value to be outputted from the rated switch 38 is gradually decreased at the predetermined pace of decrease from the predetermined value (the output value of the function generator 36) to zero (the output value of the signal generator 40) (is decreased until the time T4).

The target output for the power generator 23 is set up by subtracting the negative side bias value at this time from the LDSET by use of the subtracter 42. Subsequently, the output deviation between the target output and the power generator output (the active electric power) is calculated by the deviation operator 43. Then, the PI controller 44 performs the proportional-integral operation based on the output deviation, and the fuel control valve 26 is activated on the basis of a result of the proportional-integral operation (the valve aperture of the fuel control valve 26 is decreased). As a consequence, the amount of fuel supply to the gas turbine 21 is decreased, and the gas turbine output is thus reduced. Accordingly, the power generator output (the active electric power) is decreased. It is possible to finally cause the power generator output (the active electric power) to be equal to the target output (the requested load set value).

As described above, according to the gas turbine load control device 30 of this embodiment, instead of defining the LDSET directly as the target output for the power generator 23, the target output setting means (the adder 41 and the subtracter 42) sets up the target output for the power generator 23 in the following manner. Specifically, when the load setting means (the deviation operator 31, the high/low monitors 32 and 33, and the analog memory 34) gradually increases the LDSET in response to the increase in the requested load set value inputted by the requested load setting means, the target output setting means sets up the target output for the power generator 23 by adding the positive side bias value to the LDSET. When the load setting means gradually decreases the LDSET in response to the decrease in the requested load set value inputted by the requested load setting means, the target output setting means sets up the target output for the power generator 23 by subtracting the negative side bias value from the LDSET. Thus, for example, even when the relatively long time constant T for the proportional-integral control is set up so that the gas turbine 21 can be stably operated in response to a variation in the power factor of the electric power system, it is made possible to accelerate the follow-up of the power generator output in response to the increase or decrease in the requested load set value.

Figure 12:
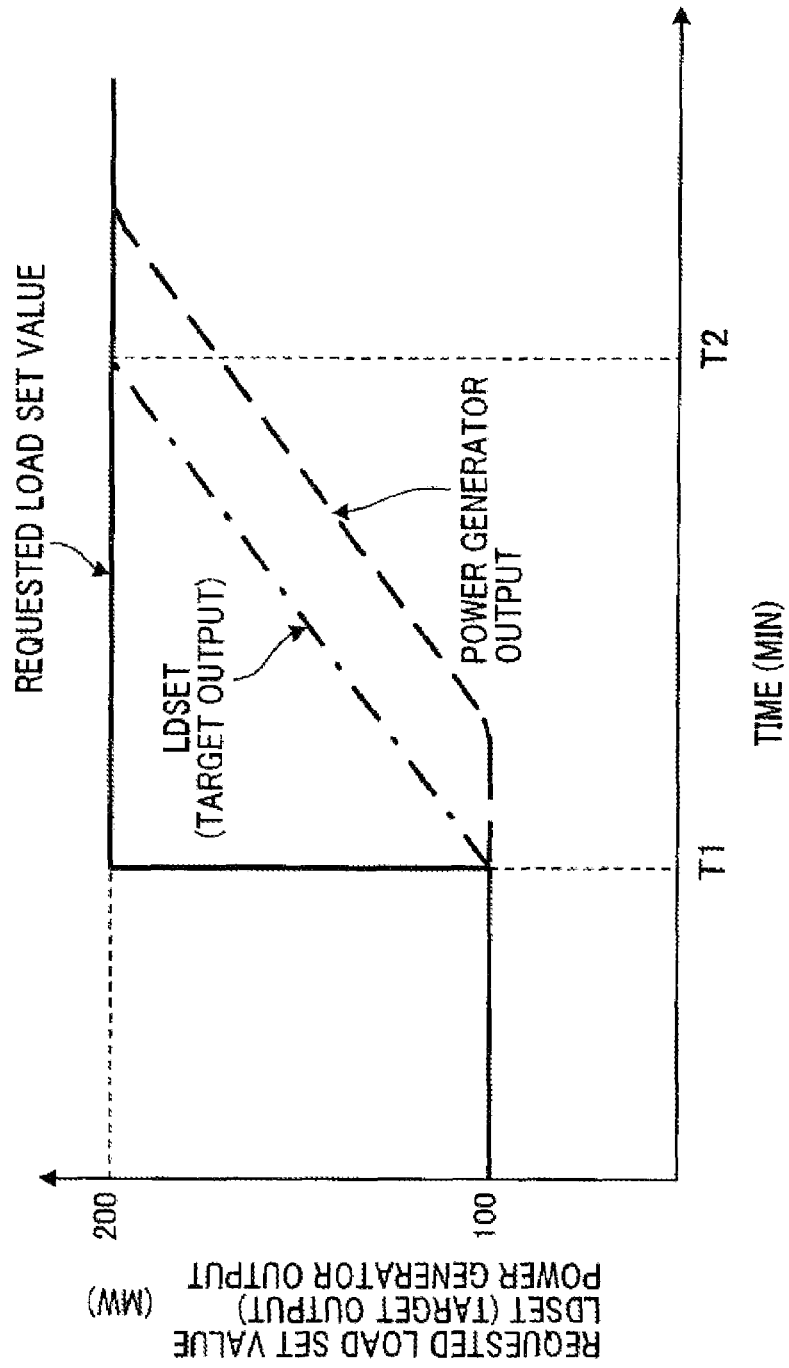
FIG. 12 is an explanatory chart showing variations of LDSET (a target output) and a power generator output (an actual output) in response to an increase in a requested load set value in a case where the conventional gas turbine load control device is employed.

Comparing FIG. 8 with FIG. 12, the gas turbine load control device 30 (FIG. 8) of this embodiment is configured to set up the target output by adding the positive side bias value to the LDSET, and the conventional gas turbine load control device (FIG. 12) is configured to define the LDSET directly as the target output. It is apparent that the power generator output follows the variation in the requested load set value faster in the case of the gas turbine load control device 30 of this embodiment as compared to the case of the conventional gas turbine load control device. This is because the gas turbine load control device 30 of this embodiment is configured to add the positive side bias value to the LDSET.

According to the gas turbine load control device 30 of this embodiment, the first bias setting means (the function generator 35, the signal generator 39, and the rated switch 37) defines the positive side bias value as a function of the LDSET, and the second bias setting means (the function generator 36, the signal generator 40, and the rates switch 38) defines the negative side bias value as a function of the LDSET. Hence, it is made possible to define the positive side bias value and the negative side bias value by using more appropriate values which correspond to the gas turbine load band (the power generator output).

Moreover, according to the gas turbine load control device 30 of this embodiment, the first bias setting means (the function generator 35, the signal generator 39, and the rated switch 37) gradually increases the positive side bias value at the predetermined pace of increase from zero until the positive side bias value reaches the predetermined value when the load setting means (the deviation operator 31, the high/low monitors 32 and 33, and the analog memory 34) starts increasing the LDSET. The first bias setting means gradually decreases the positive side bias value at the predetermined pace of decrease from the predetermined value until the positive side bias value reaches zero when the load setting means terminates the increase in the load set value. Meanwhile, the second bias setting means (the function generator 36, the signal generator 40, and the rates switch 38) gradually increases the negative side bias value at the predetermined pace of increase from zero until the negative side bias value reaches the predetermined value when the load setting means starts decreasing the load set value. The second bias setting means gradually decreases the negative side bias value at the predetermined pace of decrease from the predetermined value until the negative bias setting means reaches zero when the load setting means terminates the decrease in the load set value. Accordingly, it is made possible to control the load more stably as compared to the case of changing the positive side bias value and the negative side bias value stepwise.

The present invention relates to a gas turbine load control device configured to control an amount of fuel supply to a gas turbine so as to control a gas turbine output (a power generator output) to achieve a target output. The invention is useful for application to a case of improving a following capability (response) of the power generator output in accordance with a variation in a requested load set value which is requested (inputted) by requested load setting means such as a central load dispatching center.

What is claimed is:

1. A gas turbine load control device comprising:
    load setting means which gradually increases a load set value at a predetermined pace of increase until the load set value reaches a requested load set value when the requested load set value is increased, and which gradually decreases the load set value at a predetermined pace of decrease until the load set value reaches the requested load set value when the requested load set value is decreased;
    first bias setting means which sets a positive side bias value as a bias value for the load set value;
    second bias setting means which sets a negative side bias value as the bias value for the load set value;
    target output setting means which sets a target output for a power generator by adding the positive side bias value to the load set value when the load setting means gradually increases the load set value in response to the increase in the requested load set value, and which sets the target output by subtracting the negative side bias value from the load set value when the load setting means gradually decreases the load set value in response to the decrease in the requested load set value;

output deviation operating means which calculates output deviation between the target output and an output of a power generator to be measured by power generator output measuring means; and proportional-integral controlling means which controls flow rate controlling means for fuel of a gas turbine configured to rotate the power generator, by performing a proportional-integral operation based on the output deviation.

2. The gas turbine load control device according to claim 1, wherein the first bias setting means defines the positive side bias value as a function of the load set value, and the second bias setting means defines the negative side bias value as a function of the load set value.

3. The gas turbine load control device according to any of claims 1 and 2, wherein the first bias setting means gradually increases the positive side bias value at a predetermined pace of increase from zero until the positive side bias value reaches a predetermined value when the load setting means starts increasing the load set value, and gradually decreases the positive side bias value at a predetermined pace of decrease from the predetermined value until the positive side bias value reaches zero when the load setting means terminates the increase in the load set value, and the second bias setting means gradually increases the negative side bias value at a predetermined pace of increase from zero until the negative side bias value reaches a predetermined value at a predetermined pace of increase when the load setting means starts decreasing the load set value, and gradually decreases the negative side bias value at a predetermined pace of decrease from the predetermined value until the negative side bias value reaches zero when the load setting means terminates the decrease in the load set value.

* * * * *